United States Patent

Caubet

[15] 3,658,576

[45] Apr. 25, 1972

[54] FRICTION ELEMENTS OF MACHINES SUBJECTED TO HEAVY LOADS

[72] Inventor: Jacques Jean Caubet, Saint-Etienne, France

[73] Assignees: Automobiles M. Berliet, Lyon, France; Hydromecanique Et Frottement, Saint-Etienne (Loire), France

[22] Filed: May 1, 1968

[21] Appl. No.: 725,900

[52] U.S. Cl. .................. 117/105, 29/149.5 PM, 117/131, 308/237, 308/240
[51] Int. Cl. ..................................... C23c 7/00, F16c 17/12
[58] Field of Search ............... 308/237, 240, 241; 117/71 M, 117/105, 131, 160, 130; 29/148.4 L, 149.5 PM, 149.5 S, 149.5 B, 149.5 C

[56] References Cited

UNITED STATES PATENTS

| 2,329,483 | 9/1943 | Queneau et al. | 308/237 |
| 2,588,421 | 3/1952 | Shepard | 117/71 M |
| 2,588,422 | 3/1952 | Shepard | 117/71 M X |
| 2,854,597 | 9/1958 | Foote et al. | 117/71 M X |
| 3,010,843 | 11/1961 | Eder | 117/105 X |
| 3,425,112 | 2/1969 | Roemer | 308/237 X |
| 2,320,830 | 6/1943 | Ricardo et al. | 308/341 X |
| 2,787,503 | 4/1957 | Palsulich et al. | 308/341 |

FOREIGN PATENTS OR APPLICATIONS

| 1,120,835 | 12/1961 | Germany | 117/237 |
| 705,067 | 3/1954 | Great Britain | |

OTHER PUBLICATIONS

Handbook of Chemistry and Physics, 42nd Ed. Cleveland, Ohio, Chemical Rubber Publishing Co., 1961., p. 2,156.

*Primary Examiner*—Alfred L. Leavitt
*Assistant Examiner*—C. K. Weiffenbach
*Attorney*—Stevens, Davis, Miller & Mosher

[57] ABSTRACT

Metallic friction elements of machines sliding one against the other, one of which has a friction surface coated with a layer of molybdenum applied by metallization, the friction surface of the other element being coated with a layer of copper, characterized by the fact that the layer of copper is also effected by metallization.

8 Claims, No Drawings

FRICTION ELEMENTS OF MACHINES SUBJECTED TO HEAVY LOADS

It has already been proposed to produce a pair of metallic friction elements of machines, sliding one on the other or rotating one inside the other, in such manner that the friction surface of one of the elements is covered with a coating of molybdenum and that the friction surface of the other element is essentially constituted by a cupreous metal.

It has also been proposed to form the coating of molybdenum by metallization, the layer of cupreous metal being obtained by electrolysis, and also to form the element to be coppered from a metal with a low Young's modulus such as a light metal.

According to the present invention, the cupreous metal is a deposit of copper obtained by metallization by means of a metal-spraying gun.

The improvement obtained by making the metallized deposit instead of the electrolytic deposit of copper consists of a better fixing of the copper deposit on the surface of the metallic base.

In addition, the metallization has the effect of obtaining a combination of copper and copper oxide, which improves the friction qualities with respect to the other element which has been given a coating of molybdenum, also by metallization. The surfaces obtained by metallization may be employed in the rough state or machined or otherwise treated with or without grinding.

Finally, before putting into service, an initial greasing can be effected by molybdenum bisulphide in the form of a hyper-micronized dry powder or in the form of powder of appropriate granular size in suspension in an oil.

In a non-limitative example of the improvement according to the invention, the segments of the piston of a gas engine of 1.50 m. in diameter were metallized with copper until a layer of 0.3 mm. in thickness was obtained, this layer not having been ground. The boring of the engine cylinder lining subjected to heavy loads was given a coating of molybdenum of 0.5 mm. in thickness, applied by metallization and not having been subjected to grinding. This metallization was carried out with great care, in particular following preheating to 80° C., and sand-blasting.

After 20,000 hours working, the wear both of the liner and of the segments was extremely small and did not exceed 0.2 mm., that is to say only one twentieth of that observed on similar parts which had not been subjected to the surface treatments according to the invention.

Another example of embodiment consists of a two-cylinder uranium fluoride compressor, of which the two crank bearing surfaces on the crankshaft were metallized, one with molybdenum and the other with copper. The bores of the two crank-rods were also metallized, one with copper and the other with molybdenum. After grinding, the thickness of the four layers deposited with a spraying gun was 0.3 mm.

The crank-rod metallized with copper was mounted on the crank-shaft bearing surface metallized with molybdenum, while the crank-rod metallized with molybdenum was mounted on the bearing surface of the crank-shaft metallized with copper.

The assembly was rotated for several hundred hours at 400 r.p.m. with an initial clearance of 0.02 to 0.03 mm. No appreciable wear could be detected.

An initial greasing of the bearing surfaces was carried out with molybdenum bisulphide. No periodic greasing was effected subsequently. The same results were obtained for the two crank-rods. It should be noted that the surface treatments resulted in a reduction of noise during working of the compressor.

Finally, it is also possible to produce the element to be coppered by metallization from a metal having a low Young's modulus, such as a light metal or light alloy.

For example, if a shaft is to be rotated in a bearing under doubtful conditions of lubrication, or without any lubrication, the shaft material to be adopted will be carbon steel tempered before metallization, while the ring will be turned from a light alloy subsequently coated with copper by metallization.

The low Young's modulus of the light alloy permits the provision of supporting surfaces capable of more extensive elastic deformations, and thus renders the bearings less sensitive to possible misalignments of the machines.

According to the invention, it is possible still further to increase to a considerable extent the resistance to wear of the elements constituting the frictional pair, when the surface coated with a porous layer of molybdenum by projection with a spraying gun is subjected, after grinding, to impregnation with hardenable plastic material by close reticulation. This plastic material must be capable of application under vacuum, cold or hot, in the liquid or syrupy state, on the surface of the porous molybdenum, the reticulation being effected by heat and/or by means of a catalyst or hardening agent.

Use will preferably be made of epoxy resins which, in addition to giving a considerable improvement in the friction conditions, have a good chemical inertia and protect the supporting metal coated with molybdenum very effectively against corrosion.

Thus, for example, if a shaft is to be rotated in a bearing in the ambient air or in water, there will be chosen a shaft coated with metallized molybdenum, ground, and then impregnated with epoxy resin, while the ring will be of solid copper. The filling-up of the porous structure of metallized molybdenum provides an effective protection against corrosion of the metal support which can then be chosen of semi-hard steel, and thus renders the articulation insensitive to corrosion effects.

The example which follows brings out clearly the advantage of the invention.

The friction pairs are universal joints for lorries. The parts are convex and have a diameter of 40 mm.; they are made from tempered non-alloyed construction steel having the following standard composition, expressed in percentage by weight : C = 0.42 to 0.48, Mn = 0.5 to 0.8, Si ≼ 0.40, P ≼ 0.04, S ≼ 0.035 and S + P ≼ 0.065. They were coated by metallization with a layer of 0.1 mm. of molybdenum. The concave parts in which the convex parts were fitted were cups of solid extruded copper.

In a first series of tests, the convex parts oscillated at a frequency of one cycle per second from + to −20° between the cups, the joints worked in the dry state without any incident while immersed in water loaded with mud for 1,000 hours under a lateral pulsating load of 10,000 N.

In a second series of tests, there were subjected to the same conditions, universal joints in which the convex parts coated with molybdenum were ground and then impregnated under a vacuum of 5 × 10$^{-1}$ mm. Hg of 7828 A epoxy resin according to the present invention. Now, the universal joints thus treated were able to work without incident for at least 1,500 hours, that is to say for a period 50 percent greater than that of the previous tests.

I claim:

1. Metallic friction elements of machines sliding one against the other, one of which has a friction surface constituted by a sprayed porous molybdenum layer, the friction surface of the other element being constituted by a sprayed copper layer.

2. Metallic friction elements according to claim 1 further comprising a hyper-micronized dry powder of molybdenum bisulphide thereinbetween as lubricant.

3. Metallic friction elements according to claim 1 further comprising a molybdenum bisulphide powder in suspension in an oil thereinbetween as lubricant.

4. Metallic friction elements according to claim 1, wherein the copper layer is on a metal having a low Young's modulus.

5. Metallic friction elements according to claim 4, wherein said metal is selected from the group consisting of aluminum and aluminum alloys.

6. Metallic friction elements according to claim 1, wherein at least one of the two friction surfaces has a ground finish.

7. Metallic friction elements according to claim 6 wherein the friction surface having the ground finish is the molybdenum layer, said ground molybdenum layer having a plastic material impregnated therein, said plastic material having a close reticulation.

8. Metallic friction elements according to claim 7, wherein said plastic material impregnation is an epoxy resin.

* * * * *

PO-1050
(5/69)

UNITED STATES PATENT OFFICE
CERTIFICATE OF CORRECTION

Patent No. 3,658,576      Dated April 25, 1972

Inventor(s) Jacques Jean Caubet

It is certified that error appears in the above-identified patent and that said Letters Patent are hereby corrected as shown below:

The benefit of the filing date of French Application No. P.V. 105.334 of May 5, 1967, is claimed.

Signed and sealed this 5th day of September 1972.

(SEAL)
Attest:

EDWARD M. FLETCHER, JR.
Attesting Officer

ROBERT GOTTSCHALK
Commissioner of Patents